United States Patent [19]

Zhukovsky et al.

[11] 4,163,741

[45] Aug. 7, 1979

[54] SAND MOLD COMPOSITIONS CONTAINING AS CATALYST, METHYL ALCOHOL SOLUTIONS OF BENZENESULPHONIC ACID

[76] Inventors: Sergie S. Zhukovsky, Profsojuznaya ulitsa, 17, korpus 1, kv. 15, Moscow; Nikolai I. Shadrin, Leninsky prospekt, 5, kv. 15, Donetsk; Sergei D. Teplyakov, Seleznevskaya ulitsa, 13, kv. 3, Moscow, all of U.S.S.R.; Abram M. Lyass, deceased, late of Moscow, U.S.S.R.; by Inna E. Lyass, administrator, Sharikopodshipnikovskaya ulitsa, 2, kv. 42, Moscow, U.S.S.R.

[21] Appl. No.: 787,764

[22] Filed: Apr. 15, 1977

[51] Int. Cl.² .......................... C08K 3/36; C08K 5/05; C08K 5/42
[52] U.S. Cl. ................... 260/33.4 R; 260/38; 164/43; 525/487
[58] Field of Search ................ 260/59 R, 33.4 R, 38, 260/DIG. 40; 164/43; 428/404, 407

[56] References Cited

U.S. PATENT DOCUMENTS

| | | | |
|---|---|---|---|
| 2,233,875 | 3/1941 | Schmidt et al. | 260/33.4 R X |
| 2,813,846 | 11/1957 | Farber et al. | 260/33.4 R X |
| 3,536,575 | 10/1970 | Maitrot | 260/59 R X |

FOREIGN PATENT DOCUMENTS 763812 12/1956 United Kingdom .
853766 11/1960 United Kingdom .

*Primary Examiner*—Sandra M. Person
*Attorney, Agent, or Firm*—Lackenbach, Lilling & Siegel

[57] ABSTRACT

A sand for making cores and moulds which comprises 100 parts by weight of a refractory filler, between 1.0 and 3.0 parts by weight of a binder, and between 0.4 and 2.0 parts by weight of an acid catalyst of crystal hydrate benzene-sulphonic acid in the form of an 80- to 92-percent solution in methyl alcohol.

The present invention makes it possible to prepare a sand for making cores and moulds which displays a cold setting rate and strength higher than ever before. The cold setting rate in terms of the time after mixing at which the pattern or corebox can be removed satisfactorily is not over 1 min. and the compression strength of the sand is at least 60 N/cm² at the time of removing the pattern or corebox.

10 Claims, No Drawings

SAND MOLD COMPOSITIONS CONTAINING AS CATALYST, METHYL ALCOHOL SOLUTIONS OF BENZENESULPHONIC ACID

The present invention relates to foundry practice, and more specifically to cold-setting sands used as the material for making cores and moulds.

The invention will find wide application wherever high-run and mass production of castings at a rate of, say, 10,000 pieces per annum is involved.

Cold-setting sands for making cores and moulds, incorporating synthetic resins as the binder, are particularly popular in modern foundry practice. They improve physical and mechanical properties of the cores and moulds and effect savings in labor in the course of shake-out and settling.

Among the synthetic resins used in foundry, worth mentioning are phenol-formaldehyde resol resins reputed for their high thermal resistance, which, however, are inexpensive and readily available industrial products. The sands containing synthetic resins set at room temperature in the presence of acid catalysts, e.g., organic and mineral acids, acid salts.

For example, a known cold-setting sand for making cores and moulds comprises a refractory filler, e.g., quartz sand, a binder of phenol-formaldehyde resol resin and an acid catalyst in the form of organic sulphonic acids, particularly low-molecular weight sulphonic acids of benzene, toluene, xylene and naphthalene (Swiss Pat. No. 449,857). Said aromatic sulphonic acids are represented in the form of crystal hydrates with variable amounts of chemically combined water ($ArSO_3H \cdot nH_2O$) and displaying the consistency of a solid at room temperature.

To enable precise dosage of the catalyst and its uniform distribution over the mass of sand, the catalyst is introduced in the form of a solution prepared in advance. The solvent commonly used in preparing solutions of aromatic sulphonic acids is water. Yet, water impairs physical and mechanical properties of the film formed by the resin in hardening.

The maximum concentration of solid aromatic sulphonic acids in water is between 70 and 75 percent, indicating that the aqueous solvent content of the solution is rather high (between 25 and 30 percent). The catalytic activity of aqueous solutions of aromatic sulphonic acids, expressed in terms of the rate of cold setting of moulding sand prepared from quartz sand and resin, is obviously too low so that cores fail to set within an interval between 1 and 3 min. This fact limits the scope of use of the known moulding sand containing quartz sand and resin under the conditions of high-run and mass production.

There is also known a cold-setting or, as called in this particular case, no-bake sand for making cores and moulds containing a refractory filler of silica sand, a binder in the form of furan-type resin and an acid catalyst—a 50-percent solution of commercial-grade toluenesulphonic acid in methyl alcohol known as methanol (Foundry, 1972, v. 100, no. 3, pp. 81-84). Methanol is obviously used for the purpose of enhancing the stability of the acid solution at temperatures as low as 0° to 10° C. Yet, the catalytic activity of crystal hydrate toluenesulphonic acid in solution is too low for a sufficiently rapid cold setting of sands with phenol-formaldehyde binder irrespectively of the nature of the solvent used and the concentration of the acid in the solution. The cold-setting rate of such sands fails to meet the requirements of high-run and mass production.

It is an object of the present invention to eliminate said disadvantages.

Another object of the present invention is to provide a sand for making cores and moulds which exhibits a setting rate higher than that of the known sands.

A further object of the present invention is to provide a sand for making cores and moulds which exhibits extra strength.

Said objects are attained by the fact that in a sand for making cores and moulds containing a refractory filler, a binder-resol phenol-formaldehyde resin and acid catalyst—a solution of an aromatic sulphonic acid in alcohol used as the acid catalyst, in accordance with the invention, is crystal hydrate benzenesulphonic acid in the form of an 80- to 92-percent solution in methyl alcohol and the ingredients are taken in the following proportion (parts by weight per 100 parts by weight of refractory filler);

resol phenol-formaldehyde resin, between 1.0 and 3.0; crystal hydrate benzenesulphonic acid in the form of an 80- to 92-percent solution in methyl alcohol, between 0.4 and 2.0.

By virtue of the present invention it is now possible to obtain sand for cores and moulds with a cold-setting cycle as short as 1 min, maximum which is only 1/5 of the duration of cold-setting cycle characteristic of the known sands. At the same time the strength during the initial period of setting, i.e., within an interval of 4 to 10 min, has increased half as much again to three-fold, enabling the use of the sand disclosed under the conditions of high-run and mass production of castings (at a rate over 10,000 pieces per year).

Other objects and advantages of the present invention will be understood from the following detailed description of a sand for making cores and moulds.

Disclosed herein is a sand for making cores and moulds containing a refractory filler, a binder (resol phenol-formaldehyde resin) and an acid catalyst which is crystal hydrate benzene sulphonic acid in the form of an 80- to 92-percent solution in methyl alcohol, the ingredients being taken in the following proportion (in parts by weight per 100 parts by weight of the refractory filler);

resol phenol-formaldehyde resin, between 1.0 and 3.0;

crystal hydrate benzenesulphonic acid in the form of an 80- to 92-percent solution in methyl alcohol, between 0.4 and 2.0.

It is expedient that the refractory filler used is quartz sand with a silicon dioxide content of at least 98 percent, a clay content of not over 0.5 percent and with a particle size averaging 0.2 mm in the main fractions. If necessary, use can be made of a filler displaying better refractory properties than sand as, for example, zircon with a zirconium silicate content of at least 98 percent and particles averaging in size between 0.1 and 0.2 mm in the main fractions.

It is also expedient that the binder used in resol phenol-formaldehyde resin synthetized from phenol and formaldehyde taken in initial molar ratios of 1 : 1.2 and 1 : 2.0, respectively, in the presence of catalysts which can be oxides, acetates and oxalates of alkali earth metals, zinc or manganese. If there is a need to improve the strength of the sand disclosed, the binder can be modified with a silane taken in a small amount, say between 0.1 and 0.5 percent of the weight of the resin. Suitable for use is, for example, gamma-aminopropyl-triethoxysilane.

The binder content of the sand is taken within said limits for the obvious reason that the presence of the binder in an amount less than 1 part by weight has an adverse effect on the physical and mechanical properties of cores and moulds whereas an increase of said amount over 3 parts by weight worsens the sanitary conditions at the workplace due to vapors of formaldehyde, methanol and phenol liberating aboundingly into the atmosphere.

The cold setting of the sand takes place due to the presence of an acid catalyst. When a phenol-formaldehyde binder is being used, a solution of a crystal hydrate aromatic acid is commonly given preference as the acid catalyst. Benzenesulphonic acid is superior to other sulphonic acids (toluene, xylene and naphthalene) in point of strength, the calculated value of what is called the potential of semineutralization serving as an analytical criterion of the relative strength displayed by the sulphonic acid in the solvent.

Taking into account that the object is to provide a highly active acid catalyst, it has been suggested to use a solution of crystal hydrate benzenesulphonic acid with a maximum content of the acid proper and with a minimum content of the solvent. Meeting this requirement is a solution of benzenesulphonic acid in methyl alcohol (methanol) with a weight concentration between 80 and 92 percent. It has been found that no other organic solvent among those commonly used (alcohols, ketones, ethers) is suitable to produce a stable solution of an aromatic sulphonic acid with a weight concentration as high as that.

The upper limit of the weight concentration of crystal hydrate benzenesulphonic acid is selected in the light of the fact that it is required to obtain a saturated solution with the maximum possible concentration. The lower limit of the weight concentration of crystal hydrate benzenesulphonic acid is selected with the aim of obtaining a quartz sand/resin system characterized by a sufficiently rapid cold-set rate.

Crystal hydrate benzenesulphonic acid is of the formula $C_6H_5SO_3H.nH_2O$, where n is a variable changing over the range between 0.5 and 2. An industrial product based on said acid consists of dark-gray crystals containing at least 90 percent by weight of benzene monosulphonic acid, not over 3.5 percent by weight of free sulphuric acid, not over 0.2 percent by weight of free benzene, the balance being sulphone admixtures and crystal hydrate water.

The catalyst is prepared by grinding the starting benzenesulphonic acid and then the calculated amount of acid is gradually introduced into methanol under the conditions of constant stirring; the process of dissolving is intensified by heating the methanol to between 40° and 50° C.

The reasons for selecting the catalyst content of the quartz sand/resin system within said limits are as follows. A catalyst content less than 0.4 parts by weight fails to provide for a satisfactory cold-setting rate, whereas an increase in said content beyond 2 parts by weight reduced overall strength of cores and moulds and the strength of their surface layer.

The disclosed sand for cores and moulds displays a cold-setting rate and strength higher than ever before and is consequently suitable for use under the conditions of high-run and mass production of castings. The cold-setting rate expressed in terms of the time after mixing at which the pattern or corebox can be removed satisfactorily is not over 1 min and the compression strength of the sand at the time of removing the pattern or corebox is at least 60 $N/cm^2$.

The present invention is illustrated by the following examples.

EXAMPLE 1

The sand for making cores and moulds used in high-run and mass production was prepared from the ingredients taken in the following proportion (in parts by weight per 100 parts of quartz sand)

binder, resol phenol-formaldehyde resin, 2.5;
hardening catalyst, 92-percent solution of crystal hydrate benzenesulphonic acid in methyl alcohol, 2.0.

The technique of preparing the sand was as follows. The acid solution, i.e., the catalyst, was introduced into the sand and intermixed for 2 min in a separate mixer at a horizontal blade shaft speed of 75 rpm. The mixture of sand with catalyst was fed into another horizontal high-speed blade mixer operating at a shaft speed of between 375 and 500 rpm and added thereto was the resin. After another period of mixing lasting 6 or 7 sec, the sand was discharged into a sand slinger used to prepare standard compression-test specimens. The specimens in the form of cylinders were tested after periods of hardening lasting 1 min 2 min, 3 min, 4 min, 5 min, 10 min, 30 min, 60 min, 120 min and 24 hr. The results are shown in Table I tabulated wherein for the sake of comparison are also the results of compression tests of specimens prepared from the known sand composed of quartz sand and resol phenol-formaldehyde resin taken in the same proportion and incorporating a catalyst which is aqueous solution of crystal hydrate benzenesulphonic acid.

Table I

| | Compression strength, $N/cm^2$, after | | | | | | | | | |
|---|---|---|---|---|---|---|---|---|---|---|
| | 1min | 2min | 3min | 4min | 5min | 10min | 30min | 60min | 120min | 24hr |
| Sand according to present invention | 68 | 83 | 99 | 105 | 146 | 193 | 215 | 225 | 255 | 280 |
| Sand of known composition | — | — | — | 35 | 78 | 164 | 200 | 210 | 335 | 240 |

As it will be noted from Table I, the sand according to the present invention is capable of assuring the minimum time (1 min) after mixing at which the pattern or corebox can be removed satisfactorily and consequently meets the requirements of high-run and mass production of castings.

EXAMPLES 2 and 3

Examples 2 and 3 illustrate the effect of the weight concentration of the solution of crystal hydrate benzenesulphonic acid in methanol (86 percent in Example 2 and 80 percent in Example 3) on the strength of test specimens prepared from the sand of the same composition and by the same technique as in Example I. The test data are tabulated in Table 2.

Table 2

| Weight concentration of crystal hydrate benzenesulphonic acid in methanol, percent | Compression strength, $N/cm^2$, after | | | | | | | | | |
|---|---|---|---|---|---|---|---|---|---|---|
| | 1 min | 2 Min | 3 min | 4 min | 5 min | 10 min | 30 min | 60 min | 120 min | 24 hr |
| 92 (Example 1) | 68 | 83 | 99 | 105 | 146 | 193 | 215 | 225 | 255 | 280 |
| 86 (Example 2) | 22 | 69 | 85 | 103 | 150 | 199 | 231 | 254 | 283 | 311 |
| 80 (Example 3) | — | 18 | 60 | 97 | 132 | 178 | 203 | 219 | 243 | 338 |

Table 2 illustrates the fact that a reduction in the concentration of crystal hydrate benzenesulphonic acid brings about a decrease in the cold-setting rate accompanied, however, by an increase in the strength at the final stage of hardening.

EXAMPLES 4 and 5

Examples 4 and 5 display the way the binder and catalyst affect the cold-setting rate. The composition of the sands tested is given in Table 3, and Table 4 contains the results of tests.

Table 3

Ingredient content in parts by weight per 100

| | parts by weight of quartz sand | |
|---|---|---|
| | Resol phenol-formaldehyde resin | Acid catalyst, solution of benzenesulphonic acid in methanol with weight concentration of 93 per cent |
| Sand according to Example 1 | 2.5 | 2.0 |
| Sand according to Example 1 containing resin modified with 0.2 per cent of Γ-aminopropyl-triethoxysilane | 2.5 | 2.0 |
| Sand according to Example 4 | 3.0 | 2.0 |
| Sand according to Example 5 containing resin modified with 0.2 per cent of Γ-aminopropyl-triethoxysilane | 1.0 | 0.4 |

The sands tested were prepared in the same way as described in Example I.

Table 4

| | Compression strength, $N/cm^2$, after | | | | | | | | | |
|---|---|---|---|---|---|---|---|---|---|---|
| | 1 min | 2 min | 3 min | 4 min | 5 min | 10 min | 30 min | 60 min | 120 min | 24 hr |
| Sand according to Example I | 68 | 83 | 99 | 105 | 146 | 193 | 215 | 225 | 255 | 280 |
| Sand according to Example I containing resin modified with 0.2 per cent of Γ-aminopropyl-triethoxysilane | 71 | 90 | 111 | 120 | 164 | 218 | 249 | 319 | 287 | 620 |
| Sand according to Example 4 | 50 | 66 | 82 | 104 | 139 | 182 | 205 | 238 | 276 | 323 |
| Sand according to Example 5 containing resin modified with 0.2 per cent of Γ-aminopropyltriethoxysilane | 35 | 47 | 60 | 69 | 80 | 104 | 145 | 196 | 252 | 356 |

From the data contained in Tables 3 and 4 one can gather that a decrease in the resin and catalyst consumption (sand according to Example 5) and also the lowering of the relative catalyst content (sand according to Example 4) slow down the rate of sand setting. The modifications of the resin with a silane enables a sharp increase in the sand strength at final stages of setting to take place.

EXAMPLE 6

Used as the refractory filler was grained zircon whereas the rest of ingredients were the same as in Example I and so was the technique of sand preparation. The test data are given in Table 5.

Table 5

| | Compression strength, N/cm², after | | | | | | | | | |
|---|---|---|---|---|---|---|---|---|---|---|
| | 1 min | 2 min | 3 min | 4 min | 5 min | 10 min | 30 min | 60 min | 120 min | 24 hr |
| Sand according to Example I | 68 | 83 | 99 | 105 | 146 | 193 | 215 | 225 | 255 | 280 |
| Sand according to Example | 89 | 114 | 145 | 162 | 190 | 278 | 324 | 389 | 493 | 554 |

Table 5 illustrates that the replacement of quartz sand with zircon sand is conducive to a considerable increase in the strength of the moulding sand at all stages of its setting.

EXAMPLE 7

The use of a strong solution of crystal hydrate benzenesulphonic acid in methanol as the catalyst disclosed herein provides for an increase in the setting rate and strength of the sand when the traditional cold-setting process is being employed for making cores and moulds. This example serves to illustrate this fact.

The ingredients of the sand prepared by the cold-setting process were taken in the following proportion in parts by weight per 100 parts by weight of quartz sand:
binder, resol phenol-formaldehyde resin, 2.0;
hardening catalyst, 91-percent solution of crystal hydrate benzenesulphonic acid in methyl alcohol, 0.6.

The sand was prepared in the following way. The requisite amount of the acid, i.e., of the catalyst, was added to the sand and mixed in a batch-type horizontal blade mixer for 2 min at a shaft speed of 75 rpm. Further added was the resin followed by another 1-minute period of mixing which made the sand ready for use. The standard compression-test specimens of cylindrical shape prepared from the sand were tested after periods of setting lasting 30 min, 1 hr, 2hr, 4 hr and 24 hr. Tested for the sake of comparison were also specimens prepared from the sand of the known composition, containing quartz sand and resol phenol-formaldehyde resin in the same proportion and making use of 80-percent aqueous solution of crystal hydrate benzenesulphonic acid. The results of the tests are found in Table 6.

Table 6

| | Compression strength, N/cm², after | | | | |
|---|---|---|---|---|---|
| | 30 min | 1 hr | 2 hr | 4 hr | 24 hr |
| Sand according to Example 7 | 240 | 300 | 390 | 402 | 440 |
| Sand of known composition | 125 | 180 | 230 | 240 | 250 |

From Table 6 it is evident that the setting rate and strength of the sand obtained by the cold-setting process is by far higher when use is made of the catalyst disclosed, and the consumption of the catalyst disclosed is only ½ that of the known catalyst.

What is claimed is:

1. A cold setting composition for making cores and molds consisting essentially of 100 parts by weight of a refractory filler, between 1.0 and 3.0 parts by weight of a resol phenol-formaldehyde resin binder and between 0.4 and 2.0 parts by weight of a crystal hydrate benzenesulphonic acid catalyst in the form of an 80- to 92-percent solution in methyl alcohol, whereby said cores and molds have compression strength of at least 60 N/cm².

2. The composition of claim 1, wherein the refractory filler is quartz sand having a silicon dioxide content of at least 98%, a clay content of not over 0.5%, and a particle size averaging 0.2 millimeters in the main fractions.

3. The composition of claim 1, wherein the binder is synthesized from phenol and formaldehyde in molar ratios of 1:1.2 to 1:2.0, respectively.

4. A method for improving the cold setting rate and strength of cores and moles which comprises contacting 100 parts by weight of refractory filler with 1 to 3 parts by weight of resol phenol-formaldehyde resin binder and 0.4 to 2.0 parts by weight of crystal hydrate benzene sulfonic acid in the form of an 80 to 92% solution in methyl alcohol.

5. The method of claim 4, wherein the refractory filler is quartz sand having a silicon dioxide content of at least 98%, a clay content of not over 0.5% and a particle size averaging 0.2 millimeters in the main fractions.

6. The method of claim 4, wherein the binder is synthesized from phenol and formaldehyde in ratios of 1:1.2 to 1:2.0, respectively.

7. The composition of claim 1, also containing a silane in amounts varying from 0.1 to 0.5% by weight of the resin binder.

8. The composition of claim 7, wherein said silane is α-aminopropyl-triethoxysilane.

9. The method of claim 4, wherein the refractory filler is also contacted with a silane in amounts varying from 0.1 to 0.5% by weight of the resin binder.

10. The method of claim 9, wherein said silane is α-aminopropyl-triethoxysilane.

* * * * *